June 6, 1944.  C. R. FORDYCE ET AL  2,350,742

GELATION COATING PROCESS

Filed Dec. 19, 1940

CHARLES R. FORDYCE
GERARD J. CLARKE
INVENTORS

BY
ATTORNEYS

Patented June 6, 1944

2,350,742

UNITED STATES PATENT OFFICE 2,350,742

GELATION COATING PROCESS

Charles R. Fordyce and Gerard J. Clarke, Rochester, N. Y., assignors to Eastman Kodak Company, Rochester, N. Y., a corporation of New Jersey Application December 19, 1940, Serial No. 370,853

2 Claims. (Cl. 117—103)

This invention relates to coating, and more particularly to a process for coating objects by dipping them in various cellulose ester lacquers which have the ability to solidify by gelation as distinguished from ordinary cellulose ester lacquers.

As is well known, cellulose ester coatings may be applied to the surface of various objects made of wood, metal and other substances by dipping them in certain cellulose ester lacquer compositions, or by brushing or spraying such compositions onto the object. The dipping process involves the immersion of the article to be coated in the lacquer bath and gradual withdrawal therefrom with the object of producing a uniformly even coating. The success of the operation depends upon proper control of uniformity of coating, both as to thickness and surface appearance. While the lacquer dipping process presents many desirable features for the economic application of surface coatings, especially on small articles, there are a number of outstanding difficulties which severely limit its use. For example, upon withdrawal of the object from the lacquer solution there is a pronounced tendency for the uncured coating to run, building up ridges of uneven thickness upon drying. The coating of articles of irregular shape presents especial difficulty because of creeping of the fresh coating away from edges or corners, leaving a very thin coating at those places. In order to avoid these difficulties, it is usually necessary to apply only a very thin coating to the object so that such unevenness is less pronounced. However, under such circumstances, it is difficult to build up a heavier coverage by repeating dipping because the solvents in the dipping bath attack the previously applied coating, causing it to become even more uneven and, in some cases, actually to remove it completely on various localized areas.

Various attempts have been made to overcome the abovementioned difficulties which are common to all conventional cellulose ester lacquers. It has been proposed, for example, to dissolve cellulose acetate in a solvent or solvent mixture which is a solvent only at an elevated temperature, dip the article in such a solution and cool the object until solidification of the coating was effected. Solvent mixtures of alcohols and hydrocarbons have been suggested for this purpose, but such an expedient has never proved satisfactory, or even commercially operative, for the reason that such solutions undergo such a severe or sudden solidification upon cooling that the cellulose ester material precipitates from the solvent giving white or opaque coatings which, upon curing, are extremely brittle and thus entirely unsatisfactory. Such coatings have such a pronounced tendency toward separation of the liquid from the solid material as to give an effect which is known as watering, rather than undergoing homogeneous evaporation as is the case with customary lacquer solvents.

A further attempt to eliminate some of the abovementioned difficulties encountered in the use of dipping lacquers is based upon the use of cellulose nitrate lacquers and the chilling of the dipping object in order to arrest fluidity of the coating to such a degree that running of the composition is less pronounced than with a lacquer employed at ordinary temperatures. This process has the disadvantages that such refrigeration is expensive and that only certain cellulose derivatives, specifically cellulose nitrates, can be made to give satisfactory commercial operation.

This invention has as an object to provide an entirely new and improved method of producing cellulose ester coatings on the surface of various articles which can be immersed in a bath of dipping lacquer. A further object is to provide a rapid and reliable method of producing uniform cellulose ester coatings on the surface of such objects. A still further object is to provide a process of producing cellulose ester lacquer coatings which will not run, become uneven, or will not lift off or develop thin spots upon the application of successive lacquer layers. Another object is to provide a method of producing surface coatings on a wide variety of plain and irregularly surfaced objects not hitherto susceptible of coating by ordinary lacquer technique. Other objects will appear hereinafter.

These objects are accomplished by the following invention which, in its broader aspects, involves dipping the object to be coated in a solution of a cellulose organic acid ester dissolved in a liquid which is a solvent for the ester in question only at temperatures above 50° C. and which at a temperature between 10 and 50° C. will form a self-supporting gel, said solution being maintained at a temperature above 50° C. removing the dipped article from the solution and thereafter cooling the dipped article to a temperature between 10 and 50° C., followed by curing of the residual solvent therefrom.

In the following examples and description, we have set forth several of the preferred embodiments of our invention, but they are included merely for purposes of illustration and not as a limitation thereof.

In the accompanying drawing we have illustrated one type of apparatus suitable for carrying out the process of our invention.

Figure 1:
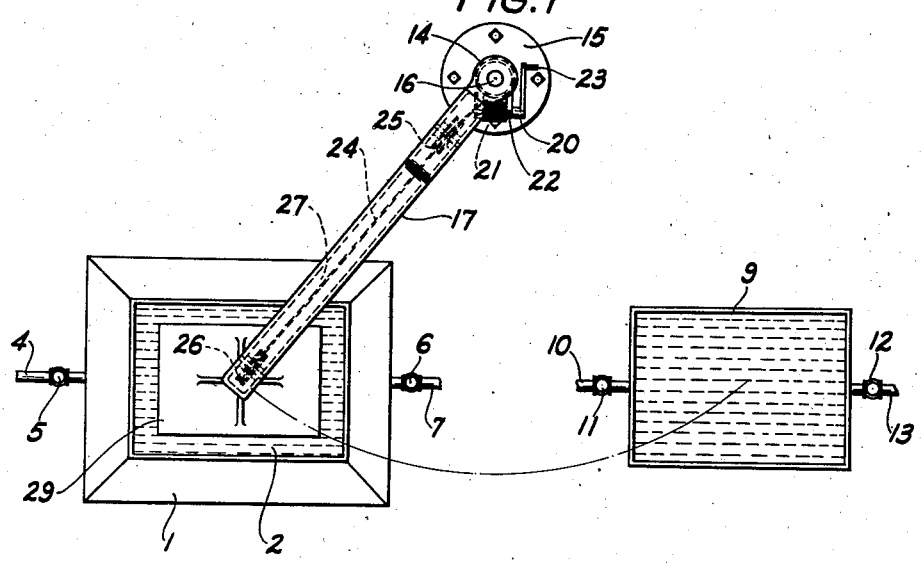
Fig. 1 is a plan view of one form of dipping apparatus suitable for the practice of our invention.
Figure 2:
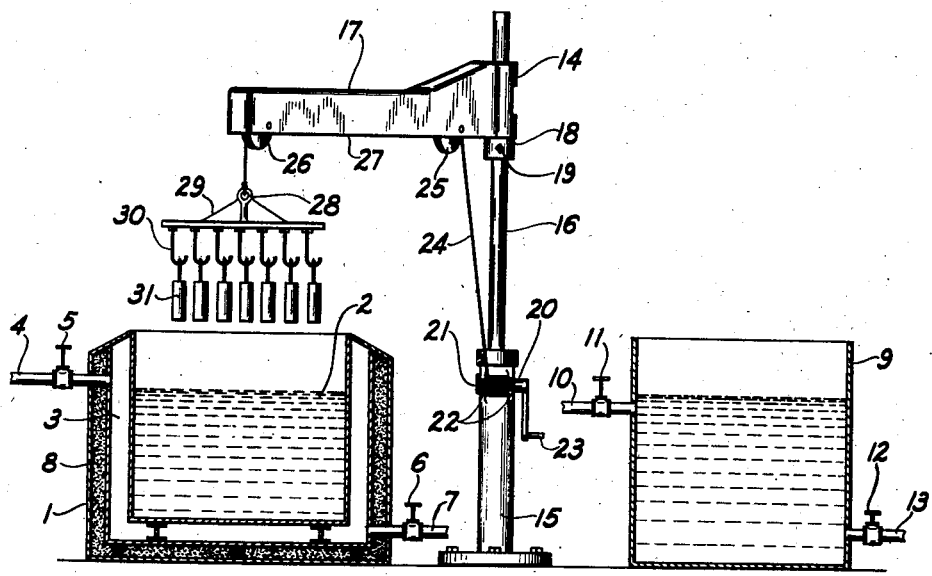
Fig. 2 is a sectional elevational view of the apparatus of Fig. 1.

Referring to Figs. 1 and 2, numeral 1 designates a jacketed dipping tank for containing the bath of dipping lacquer 2. Any suitable heating fluid, such as hot water, steam or the like, may be supplied to jacket 3 of the tank through inlet conduit 4, the fluid flow through which is controlled by valve 5. The heating fluid passes out of the apparatus through valve 6 and conduit 7, as shown. In order to prevent heat losses the outside of the tank may be provided with a suitable lagging 8.

Numeral 9 designates a second dipping tank which, under ordinary circumstances, is not lagged. This tank contains a body of non-solvent liquid which is supplied thereto by means of inlet conduit 10 controlled by valve 11. Liquid is removed from the tank through valve 12 and outlet conduit 13. Both tanks may be equipped with constant level devices (not shown) for maintaining any desired level of liquid therein. In the case of tank 9, the desired level may alternatively be maintained by an appropriate adjustment of valves 11 and 12.

Positioned adjacent to both tanks is a lowering and elevating mechanism 14 comprising standard 15 which is bored to accommodate shaft 16 which carries head 17. Provision is made for raising or lowering the head on shaft 16 through collar 18 provided with adjustable screw member 19 threaded through the collar and adapted to bear against the shaft thereby fixing the position of head 17 which rests thereon. Mechanism 14 is also provided with a windlass 20 the shaft 21 of which is rotatably mounted in suitable bearings in lugs 22 integral with standard 15 adjacent its upper part. Shaft 21 is rotated by means of crank 23.

A steel cable or cord 24 is attached to the shaft of the windlass as shown and passes over pulleys 25 and 26 rotatably mounted in the channel 27 as shown. The outer end of cord 24 is rove through eyelet 28 in dipping rack 29. This rack has secured thereto a plurality of hooks 30 to which the objects 31 to be dipped are temporarily attached by any convenient means.

The operation of the apparatus will be apparent from a consideration of Figs. 1 and 2. Dipping rack 29 is raised to an appropriate height by winding up cable 24 by means of windlass 20. The objects to be dipped are then attached to the hooks 30, head 17 is then swung over until rack 29 is directly over the dipping bath 2, whereupon the windlass is operated in the reverse direction, thus lowering the objects slowly into the body of dipping lacquer where they are allowed to stand until free from surface bubbles. The windlass is then operated slowly so as to evenly and gradually withdraw the objects from the lacquer at a uniform rate, time being allowed for the objects to acquire on their surfaces a layer of the lacquer of appropriate thickness.

The tank, as shown, should preferably be so constructed as to protect the atmosphere above the surface of the dope from air currents and to provide a fairly high concentration of solvent vapors in that vicinity. While no hard and fast rule can be laid down, it may be said that after remaining in this atmosphere at 25°–30° C. for about 30 seconds the coating will be set under the influence of the lower atmospheric temperature prevailing at that point to the point where fingerprints or other contacts will not cause damage, notwithstanding that the coating retains practically all of the original volatile solvent at this stage of the operation.

Following this gelation stage, rack 29 may then be wound up until all of the objects can clear the top of the tank. Head 17 is then swung on shaft 16 as a pivot and the lacquer coated objects left to cure by evaporation of solvent, which may be carried out at room temperature or in a moderately warm atmosphere.

As to the actual gelation step, it should be pointed out that if a dope is employed which gels at ordinary room temperatures, no positive cooling of the atmosphere in which gelation takes place is necessary. However, if a dope is used which gels only below room temperatures special provision must be made for refrigerating the atmosphere in the immediate vicinity of the dipped objects. Alternatively, the objects may be dipped in a bath of cold non-solvent liquid such as toluene. In the latter case the head 17 is swung over until the rack is in a position to be lowered into the bath contained in tank 9. This tank may, for example, contain a body of cold toluene maintained at any desired temperature by cooling coils or other appropriate device. Rack 29 is then lowered as in the previous dipping operation and the lacquered objects are immersed in the cold liquid for an appropriate interval of time, say, for ¼ to 5 minutes.

The second step of dipping the lacquered objects in a non-solvent liquid is also employed when it is desired to deposit very heavy coatings, it having been found that when a heavy coating is deposited and solidified by gelation as previously described, if the gelled coating is treated with a non-solvent liquid such as toluene, for example, the residual solvent may be removed from the coating much more evenly and uniformly than is the case where no non-solvent treatment is employed. This is presumably because of the extracting effect of the non-solvent liquid on the solvents contained in the gelled material, or the replacement of the original solvent in the gelled structure by a more volatile and therefore more easily removable solvent than the original liquid.

As to the non-solvent liquid itself, this may be any liquid which is non-solvent with respect to the cellulose ester in question. However, we prefer to employ non-solvents such as toluene, carbon tetrachloride, xylene, benzene and ligroin. Of these liquids, toluene is probably the most satisfactory, for all-around operation. It may also be said that the non-solvent liquid is preferably to be selected upon the basis of its power of dissolving or extracting the solvent from the gelled composition, since this facilitates removal of solvent from the deposited coating and leaves less residual solvent to be removed in the air curing stage.

In the case of thick layers the non-solvent dipping treatment is especially desirable in that shrinkage of the deposited coating, which is considerable, takes place uniformly throughout the coating layer, and thus precludes the possibility of buckling or distortion of the surface. This treatment may be unnecessary in the case of very thin coatings, but is desirable with heavier layers. In either case the deposited lacquer coating shrinks down tightly and evenly around the object, producing a highly satisfactory, smooth finish.

The general nature of the solutions which may be employed in the lacquering process of our invention have been referred to above. These solutions are what may be called gel dopes or lacquers, that is, cellulose ester solutions which are fluid above 50° C. but at a temperature within the range of 10–50° C. set to a non-fluid self-supporting gel. These solutions are more particularly described in the U. S. patents to Fordyce and Hunter 2,319,051, 2,319,052, 2,319,053, 2,319,054, and U. S. patent to Fordyce and Gould 2,319,055. In general, it may be said that such solutions are characterized by the fact that the solvents employed consist of alkylene dichlorides, such as propylene or butylene chlorides, usually in mixtures with ethylene dichloride or aliphatic alcohols or both. Mixtures of toluene and aliphatic alcohols of not more than 5 carbon atoms are also suitable for this purpose. Cellulose esters which have been found suitable are cellulose acetate of 38–42% acetyl and cellulose acetate propionate or cellulose acetate butyrate of at least 43% total acyl content and containing not over 40% of the higher acyl radical.

The concentration of the lacquer solutions may vary depending upon the thickness of the coating desired, but will usually fall within the limits of 5–20% of the ester, based on the weight of the total composition. Plasticizers may be employed, if desired, up to an amount representing 50% of the cellulose ester. However, high plasticizer contents are to be avoided because of a tendency toward interference with the gelling properties of the composition. On the other hand one of the outstanding advantages of the compositions of our invention is that one may deposit very heavy coatings without the use of any plasticizer whatever, as compared with molding operations usually employed to deposit such thick coatings which require considerable quantities of plasticizer in order to obtain a suitable flow under pressure.

Our invention will be more fully understood by reference to the following typical examples of our process.

*Example 1*

A solution was prepared by dissolving 100 parts of a cellulose acetate propionate of 29% acetyl and 16% propionyl content in a solvent mixture of 400 parts of propylene dichloride and 100 parts of ethylene dichloride at 75° C. with continuous stirring. The solution was filtered, then placed in a container suitable for dipping objects to be coated, such as the tank 1 of Figs. 1 and 2, and held at approximately 55° C. by means of jacket water at that temperature. The air immediately above the tank was maintained at 30–35° C. A highly polished brass door knob was lowered into the solution, allowed to stand completely immersed for a few minutes, then withdrawn slowly. The freshly coated object could be handled without finger printing almost immediately upon its removal from the dipping solution. The coating was uniform in thickness and appearance. It was cured by placing it in a drying oven at 50° C. for a number of hours. The cured coating was found to be .013" thick. The heavy coating thus obtained gave the metal a brilliant appearance and protected it from corrosion and tarnish.

A steel spatula with a wooden handle was dipped in a similar way to apply a lacquer coating to the handle. A similar film thickness was obtained.

*Example 2*

For application of very thin clear coatings a solution was prepared by dissolving 5 parts of a high viscosity cellulose acetate of 39% acetyl content in 65 parts of propylene dichloride and 35 parts of tertiary butyl alcohol at 60° C. The solution was then placed in a dipping tank at 45° C. A molded comb of cellulose acetate plastic was dipped into the solution and withdrawn at a rate adjusted to prevent running and wrinkling of the coating and the latter caused to gel at a temperature of 30–35° C. It was then cured at 50° C. Other pieces of cellulose acetate plastic were also dipped, and the products were uniformly brilliant in appearance and free from wrinkling effects which would result if solvents employed were active in dissolving the plastic composition.

This application permits a surface coat of cellulose ester to be applied over a previously formed article of the same composition.

*Example 3*

A solution of 100 parts of cellulose acetate butyrate of 16% butyryl and 32% acetyl content in 375 parts of propylene dichloride and 125 parts of ethylene dichloride was prepared at 70° C. and there was added a pigment mixture of titanium oxide equal to 3% of the weight of the cellulose ester, to which had been added a small quantity of ultramarine blue dye to improve color shade. The solution was well mixed, filtered, and placed in a dipping tank such as that illustrated in Figs. 1 and 2 where it was maintained at 45° C. by jacket water.

A polished brass door knob was immersed in the solution and slowly withdrawn to give a uniform, heavy coating. After gelation and curing the coating was found to be .012" in thickness and in appearance resembled a door knob of white plastic composition.

A number of glass bottles of irregular shape were dipped, the coating gelled and cured as above described, resulting in coatings of .011" thickness which were uniform in appearance.

A number of cardboard trays and plates were dipped in the lacquer, providing coatings which, when cured, were .006" thick, and which upon application of a second coat were increased to .014". The coatings exhibited outstanding qualities of coverage without penetrating deeply into the paper stock, a single coating being sufficient to completely surface the plates and make them resistant to warm or cold water.

Several pieces of pine wood, flat surfaced on the bottom side and evenly rounded on the upper side and end, were prepared to represent wooden objects of uneven surface. They were sanded to produce a good finish and were then dipped in the lacquer solution, the coating gelled as before, some being given a second coat after partial curing. The products were similar in appearance to white enameled coatings. The single coatings were found to be .011" thick and the double coatings .018" thick. The lacquer coatings gave very efficient surface coverage, penetrating only very slightly into the wood.

*Example 4*

To a solution of 100 parts of cellulose acetate of 40.5% acetyl content dissolved at 70° C. in 500 parts of a solvent mixture of 65% propylene dichloride and 35% tertiary butyl alcohol was added 2 parts of finely divided carbon black and the resulting mixture well stirred, filtered, and held in a dipping tank at 50° C. A variety of kitchen utensils were dipped in the solution and gelled at 30–35° C. to provide on the handles a uniform black coating, thickness of which after curing was found to be .01". The coatings were much heavier than could be obtained with black paint, and were outstanding in resistance to hot water and to mechanical abrasion.

A block of wood was machined into an oblong piece 5" wide, 6" long, and 1" thick with beveled edges on the upper surface. It was dipped in the lacquer to provide a very smooth surface, then dipped again in the black pigmented lacquer, the coating gelled and cured as previously described. It was then carefully sanded and finally dipped into a clear lacquer of identical composition to that used for the first two coatings excepting that it contained no pigment. After thorough curing the coated block presented the appearance of a molded plastic.

In addition to the solutions referred to in the above examples the following compositions have been found to give excellent results in the production of lacquer coatings by the gelation process of our invention.

| Cell. deriv. | | But. | Solvent | Solv. ratio | Plasticizer |
| --- | --- | --- | --- | --- | --- |
| Ac. | Prop. | | | | |
| Per cent | Per cent | Per cent | | | |
| 20 | 26 | | 70% toluene / 30% iso-propyl alcohol | 4:1 | |
| 16 | | 29 | 85% toluene / 15% iso-propyl alcohol | 5:1 | |
| 13.5 | | 36 | 80% toluene / 20% iso-propyl alcohol | 4:1 | 10% dioctyl phthalate. |
| 16 | 33 | | 70% toluene / 30% iso-propyl alcohol | 7:1 | |
| 30 | | 16.5 | 70% toluene / 30% tert-butyl alcohol | 6:1 | 10% triphenyl phosphate. |
| 16 | | 36 | 50% trichlorethylene / 50% tert-amyl alcohol | 5:1 | |
| 16 | | 36 | 90% trichloroethylene / 10% ethylene dichloride | 5:1 | |

One of the outstanding features of our process is the fact that objects of a variety of shapes may be dipped and removed from the dipping bath without running of the lacquer, as is the case with prior art lacquers which have a pronounced tendency to build up ridges of accumulated material or to break away from sharp edges as previously described. Another feature of our invention is the fact that the solvents employed in these gel dope lacquers is of such a nature that successive coatings may be applied one after another without thinning or spotting out of the lacquer previously deposited. This is primarily because of the fact that the superposed coating is applied at a temperature considerably below that at which the solvents actively dissolve the cellulose ester and very little solvent action is exerted upon the previously applied film. Thus any number of successive layers may be deposited evenly and uniformly one after another.

The lacquer layers may contain pigments or other coloring matter or may be deposited clear, as may be required in any given case. A layer of pigmented lacquer may be applied, say, to a wooden object and, after appropriate solidification by gelation and curing, the lacquered surface may be rubbed down with emery cloth, sandpaper, or other abrasive and successive pigmented layers deposited. A final layer of clear lacquer may then be deposited, to produce a high gloss finish if desired.

It goes without saying that almost any form or shape of object may be lacquered by our improved dipping process. In fact, it is one of the features of our invention that, due to the fact of our lacquers solidifying or setting to a gel immediately upon reaching the critical temperature range of the solution in question, no appreciable running or accretions of cellulose ester materials occurs. Furthermore, since these coatings shrink down tightly around the objects to which they are applied, an even coating is deposited over the surface of the article. Articles of wood, metal, paper, leather, and various other materials may be lacquered by our process with great facility.

What we claim and desire to secure by Letters Patent of the United States is:

1. A gelation process of coating an article which comprises preparing a lacquer solution by dissolving cellulose acetate butyrate at a temperature above 50° C. in a volatile organic liquid which is a solvent for the cellulose acetate butyrate only at a temperature above 50° C. and which will give a solution which at a temperature between 10 and 50° C. will form a self-supporting gel, said liquid being composed of a mixture composed of 90–95% by weight of toluene and 10–5% by weight of a monohydric aliphatic alcohol of 2–4 carbon atoms, dipping the article in the solution maintained at a temperature above its gelation temperature, withdrawing the article from the solution, whereby a layer of cellulose acetate butyrate is deposited on the surface of the article, gelling the deposited layer by cooling to a temperature between 10 and 50° C. and removing residual solvent from the layer.

2. A process of coating an article which comprises preparing a lacquer solution by dissolving a gelable cellulose ester at a temperature above its gelation temperature in a mixture of toluene and an aliphatic alcohol of not more than 5 carbon atoms, coating the article with the solution above its gelation temperature, gelling the coating and removing the residual solvent.

CHARLES R. FORDYCE.
GERARD J. CLARKE.